US008572151B2

(12) United States Patent
Gunwani et al.

(10) Patent No.: US 8,572,151 B2
(45) Date of Patent: Oct. 29, 2013

(54) METHODS AND APPARATUSES FOR CORDIC PROCESSING

(75) Inventors: Manoj Gunwani, Bangalore (IN); Harekrishna Verma, Bangalore (IN)

(73) Assignee: Integrated Device Technology, Inc., San Jose, CA (US)

(*) Notice: Subject to any disclaimer, the term of this patent is extended or adjusted under 35 U.S.C. 154(b) by 898 days.

(21) Appl. No.: 12/724,302

(22) Filed: Mar. 15, 2010

(65) Prior Publication Data
US 2011/0225222 A1 Sep. 15, 2011

(51) Int. Cl.
G06F 7/38 (2006.01)
(52) U.S. Cl.
USPC .......................................................... 708/441
(58) Field of Classification Search
USPC .......................................................... 708/441
See application file for complete search history.

(56) References Cited

U.S. PATENT DOCUMENTS

| | | | |
|---|---|---|---|
| 4,910,698 A | 3/1990 | McCartney | |
| 5,317,753 A | 5/1994 | Kuenemund et al. | |
| 6,480,871 B1 | 11/2002 | Phatak | |
| 7,082,451 B2 | 7/2006 | Kulkarni et al. | |
| 2004/0064493 A1* | 4/2004 | Kulkarni et al. | 708/404 |
| 2006/0200510 A1 | 9/2006 | Wang et al. | |
| 2007/0130241 A1 | 6/2007 | Bredehoft | |
| 2007/0237255 A1* | 10/2007 | Riccio et al. | 375/295 |
| 2008/0126463 A1* | 5/2008 | Hurley | 708/441 |
| 2008/0181284 A1 | 7/2008 | Husted et al. | |
| 2011/0010408 A1* | 1/2011 | Seki | 708/441 |

OTHER PUBLICATIONS

Kharrat et al., "A New Method to Implement CORDIC Algorithm", Laboratoire d'Electronique et des Technologies de l'Information LETI, (date unknown).
Wu et al., "A Unified View for Vector Rotational CORDIC Algorithms and Architectures Based on Angle Quantization Approach", IEEE Transactions on Circuits and Systems-I:Fundamental Theory and Applications, vol. 49, No. 10, Oct. 2002.
Vladimirova et al., "FPGA Implementation of Sine and Cosine Generators Using the CORDIC Algorithm", University of Surrey, Guildford (date unknown).
Andraka, "A survey of CORDIC algorithms for FPGA based computers", Andraka Consulting Group, Inc. (date unknown).
Duprat et al., "The CORDIC Algorithm: New Results for Fast VLSI Implementation", IEEE Transactions on Computers, vol. 42, No. 2, Feb. 1993.
Wang et al., "Merged CORDIC Algorithm", Department of Electrical Computer Engineering, The University of Texas (date unknown).

(Continued)

Primary Examiner — Tan V. Mai
(74) Attorney, Agent, or Firm — Traskbritt P.C.

(57) ABSTRACT

A CORDIC engine includes an N-stage CORDIC processor for performing N micro-iterations of a CORDIC algorithm and generating a 3-vector CORDIC output responsive to a 3-vector CORDIC input. A counter counts a number of M macro-iterations for the CORDIC algorithm and indicates a start of the cycle iterations. A multiplexer selects an input to the N-stage CORDIC processor as the 3-vector CORDIC input at the start of the cycle iterations or the 3-vector CORDIC output at other times. The CORDIC algorithm is complete after $N*M$ clock cycles by generating N micro-iterations for each of the M macro-iterations. In some embodiments, the CORDIC engine is coupled to programmable logic blocks as part of a programmable logic array.

25 Claims, 5 Drawing Sheets

(56) References Cited

OTHER PUBLICATIONS

Kantabutra, "On Hardware for Computing Exponential and Trigonometric Functions", IEEE Transactions on Computers, vol. 45, No. 3, Mar. 1996.

Voider, "The CORDIC Trigonometric Computing Technique", The Institute of Radio Engineers, Inc., 8:330-334 (1959).

Walther, "A unified algorithm for elementary functions", Spring Joint Computer Conference, pp. 379-385, 1971.

* cited by examiner

| PLB_7 110H | PLR_7 120H | | PLB_7 130P |
|---|---|---|---|
| PLB_6 110G | PLR_6 120G | | PLB_6 130O |
| PLB_5 110F | PLR_5 120F | CPE_1 200B | PLB_5 130N |
| PLB_4 110E | PLR_4 120E | | PLB_4 130M |
| PLB_3 110D | PLR_3 120D | | PLB_3 130L |
| PLB_2 110C | PLR_2 120C | | PLB_2 130K |
| PLB_1 110B | PLR_1 120B | CPE_0 200A | PLB_1 130J |
| PLB_0 110A | PLR_0 120A | | PLB_0 130I |

CPE Column

*FIG. 1*

METHODS AND APPARATUSES FOR CORDIC PROCESSING

TECHNICAL FIELD

Embodiments of the present disclosure relate generally to signal processing and, more particularly, to methods and apparatuses for incorporating custom signal processing engines in programmable logic arrays.

BACKGROUND

Programmable logic devices (PLDs) are general-purpose circuits that can be programmed by an end user to perform one or more selected functions. Complex PLDs (may also be referred to herein as programmable logic arrays) typically include a number of programmable logic elements and some programmable routing resources. Programmable logic elements have many forms and many names, such as Configurable Logic Blocks (CLBs), logic blocks, logic array blocks, logic cell arrays, macrocells, logic cells, and functional blocks. Programmable routing resources also have many forms and many names.

A field-programmable gate array (FPGA) is a popular type of PLD. FPGAs generally include an array of identical CLB tiles that are programmable both in function and connection to other CLBs. Some PLDs have been proposed that include fixed design memory blocks, such as Random Access Memory (RAM), and Read Only Memory (ROM) that can interface to the CLBs. Still other PLDs have been proposed that include fixed design digital signal processors and general processors that can interface to the CLBs.

However, even general custom-designed signal processors may operate slower and take up more real estate on an integrated circuit than a signal processor that is designed for a more specific task.

One such specific signal processor is a COordinate Rotation Digital Computer (CORDIC) processor. The CORDIC algorithm performs a few types of specific trigonometric functions based on vector rotations. Minor extensions to the CORDIC algorithm enable linear calculations and hyperbolic calculations of the trigonometric functions.

There is a need for an improved CORDIC processor configured for flexibility to adapt for different applications and data characteristics. Furthermore, there is a need for a CORDIC processor that can be incorporated in a programmable logic array.

BRIEF SUMMARY OF THE INVENION

Embodiments of the present invention include a custom CORDIC processor configured for flexibility to adapt for different applications and data characteristics. Some embodiments of the CORDIC processor are configured for incorporation in a programmable logic array.

In one embodiment of the invention, a CORDIC engine includes an N-stage CORDIC processor configured for performing N micro-iterations and generating a 3-vector CORDIC output responsive to a 3-vector CORDIC input. A counter is configured for counting a number of M macro-iterations and indicating a start of the cycle iterations. A multiplexer selects an input to the N-stage CORDIC processor as the 3-vector CORDIC input at the start of the cycle iterations or the 3-vector CORDIC output at other times. The 3-vector CORDIC output is configured to be complete after N*M clock cycles by generating the N micro-iterations for each of the M macro-iterations.

Another embodiment of the invention includes a programmable logic array with a plurality of programmable logic blocks configured to be programmable for a variety of interconnections and a variety of functions. The programmable logic array also includes a CORDIC engine operably coupled to at least some of the plurality of programmable logic blocks. The CORDIC engine includes an N-stage CORDIC processor configured for performing N micro-iterations and generating a 3-vector CORDIC output responsive to a 3-vector CORDIC input. A counter is configured for counting a number of M macro-iterations and indicating a start of the cycle iterations. A multiplexer selects an input to the N-stage CORDIC processor as the 3-vector CORDIC input at the start of the cycle iterations or the 3-vector CORDIC output at other times. The 3-vector CORDIC output is configured to be complete after N*M clock cycles by generating the N micro-iterations for each of the M macro-iterations.

Yet another embodiment of the invention is a method that includes performing N micro-iterations of a CORDIC algorithm and generating a 3-vector CORDIC output responsive to a 3-vector CORDIC input. A number of M macro-iterations is counted for the CORDIC algorithm and a start of the cycle iterations is indicated. The performing of the N micro-iterations is repeated for each of the M macro-iterations. An input to the N-stage CORDIC processor is selected as the 3-vector CORDIC input at the start of the cycle iterations or the 3-vector CORDIC output is selected at other times.

BRIEF DESCRIPTION OF THE SEVERAL VIEWS OF THE DRAWINGS

FIG. 1 illustrates a block diagram of a layout of a programmable logic array including CORDIC processing engines (CPEs);

DETAILED DESCRIPTION

Figure 2:
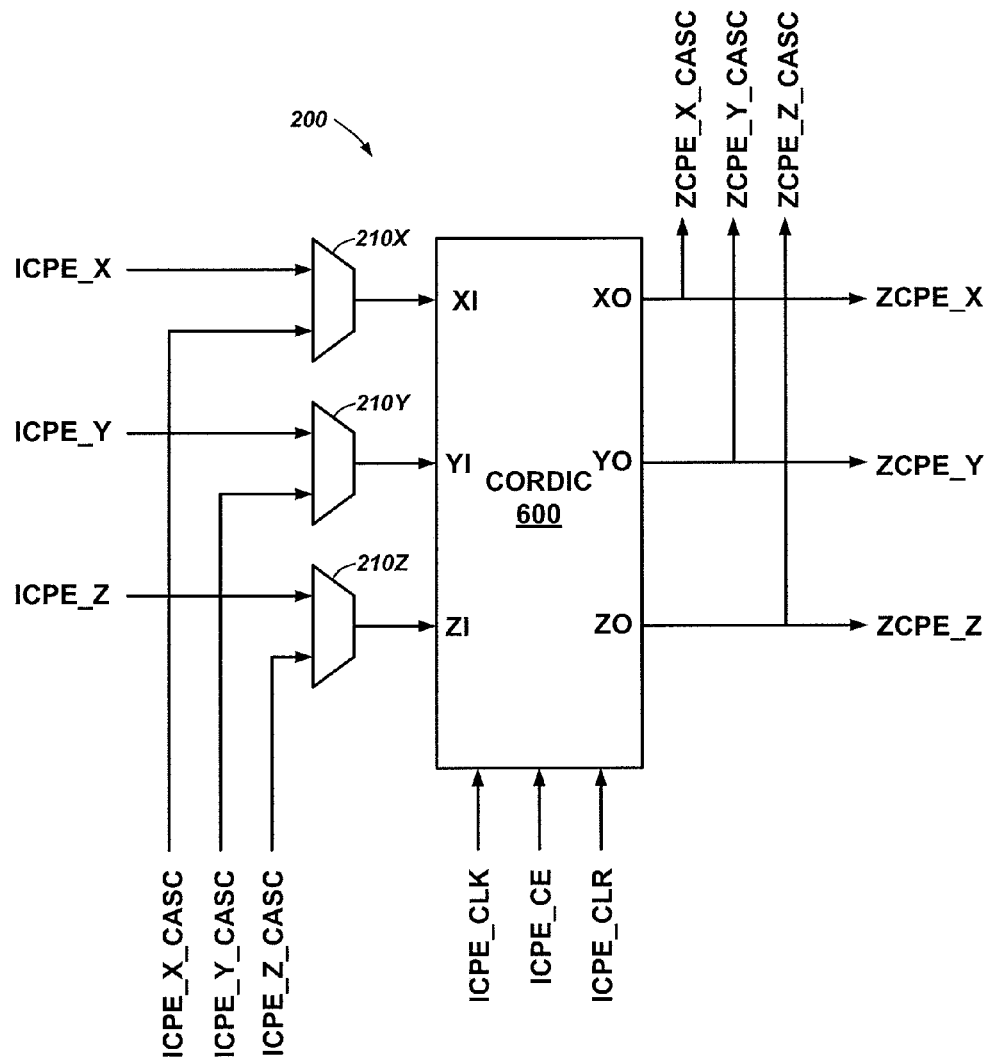
FIG. 2 is a functional block diagram illustrating how CPEs can be cascaded together to perform multiple CORDIC operations.

In the following description, elements, circuits, and functions may be shown in block diagram form in order not to obscure the present invention in unnecessary detail. Conversely, specific implementations shown and described are exemplary only and should not be construed as the only way to implement the present invention unless specified otherwise herein. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art.

Furthermore, in this description of embodiments of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is not to be taken in a limiting sense, and the scope of the present invention is defined only by the appended claims.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

The terms "assert" and "negate" may be respectively used when referring to the rendering of a signal, status bit, or similar apparatus into its logically true or logically false state. If the logically true state is a logic level one, the logically false state will be a logic level zero. Conversely, if the logically true state is a logic level zero, the logically false state will be a logic level one.

Those of skill would further appreciate that the various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and steps are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the invention described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

The term "programmable logic array" as used herein means an integrated circuit including a portion that can be reconfigured to perform different logic operations depending on how it is "programmed." Examples of programmable function elements are Configurable Logic Blocks (CLBs) Field-Programmable Gate Arrays (FPGAs), Programmable Logic Devices (PLDs), logic blocks, logic array blocks, macrocells, logic cells, and logic cell arrays.

While embodiments of the present invention are described in connection with programmable logic arrays, the methods and circuits described herein are not limited to programmable logic arrays. Many integrated circuits (ICs) may include one or more embodiments of the present invention, such as, for example an application specific integrated circuit (ASIC) an IC that includes a plurality of programmable function elements, an IC having a microprocessor, an IC having a Digital Signal Processor (DSP), an IC having a micro controller, and combinations thereof.

The term "custom" as used herein when referring to elements of a programmable logic array means a block of including circuit elements that are configured to perform a specific function with circuit elements that are laid out and interconnected with arrangements that differ from the standard layout and interconnect of the programmable array.

Embodiments of the present invention include a custom CORDIC processor configured to be incorporated in a programmable logic array. Including a hard macro allows for enhanced performance and reduced size relative to a CORDIC processor that is configured using the programmable elements of the programmable array. Furthermore, embodiments of the present invention retain flexibility and programmability for a wide variety of applications that may be encountered on programmable logic array designs that need one or more CORDIC processing engines.

Elements described herein may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1).

FIG. 1 illustrates a block diagram of a layout of a programmable logic array 100 including CORDIC processing engines (CPEs) (200A and 200B). As shown in FIG. 1, a CPE column may include one or more CPEs 200 embedded within a programmable logic array 100 in the form of a column. One or more such columns may be embedded in the programmable logic array. Of course, a column is an arbitrary orientation; embodiments of the present invention may also be configured with row orientations and differences in layout that will be apparent to a person of ordinary skill in the art.

In FIG. 1, Programmable Logic Blocks (PLBs) 110 are show as the basic tile of the programmable logic array 100. Most programmable logic arrays 100 are constructed out of a tile block, such as those of FIG. 1. However, some embodiments of the present invention may not include PLBs 110. A column of PLBs (110A-110H) is shown to the left of the CPEs 200 and a column of PLBs (110I-110P) is shown to the right of the CPEs 200. A typical PLB 110 may include within it one or more logical computation cells and a routing matrix that interconnects these cells to one or more cells in other PLBs 110.

A routing matrix (may also be referred to herein as a routing crossbar) is illustrated as blocks of Programmable Logic Routing (PLR). In FIG. 1 PLRs (120A-120H) are illustrated as corresponding with the size and placement of the PLBs 110. However, the PLRs 120 may be configured in other sizes. As non-limiting examples, the PLR 110 may be a single PLR 110 spanning a height of a single CPE 200, spanning the height of multiple CPEs 200, as well as other configurations. Furthermore, the PLRs 120 may be placed on the left side, the right side, or both sides of the CPEs 200 in different embodiments. The PLRs 120 provide an interconnection interface between the CPEs (200A and 200B) and the PLBs (110A-110H and 130A-130H), which may enable the interconnection network in the programmable logic array 100 to be consistent and not disrupted by the embedding of the CPE column (200A and 200B). As a result, the CPEs (200A and 200B) can be easily integrated into the programmable logic array as well as the software flow associated with programming the programmable logic array 100. Furthermore, the PLRs 120 may reduce the amount of area needed to provide routing between the CPEs 200 and the PLBs 110 and may enhance timing of input and output signals relative to connections directly to the programmable fabric of PLBs 110.

FIG. 2 is a functional block diagram illustrating how CPEs 200 can be cascaded together to perform multiple CORDIC operations or additional iterations of the same CORDIC operation as is explained below. Referring to FIGS. 1 and 2, inputs ICPE_X, ICPE_Y, and ICPE_Z may be routed to the CPE block 600 from the PLBs 110 of the programmable logic array 100 and routed through the column of PLRs 120 adjacent to the CPE column 140. Similarly, the ZCPE_X, ZCPE_Y, and ZCPE_Z are outputs from the CPE block 600 that may be routed back into the programmable logic array 100 and to the PLBs 110 through the PLR 120 column.

FIG. 2 also illustrates cascaded inputs and outputs of the CPE. Cascaded inputs ICPE_X_CASC, ICPE_Y_CASC, and ICPE_Z_CASC to a CPE 200 originate from a CPE 200 instance one or more locations below it in the CPE column 140. Multiplexers (210X, 210Y, 210Z) may be used to select whether the inputs to the CORDIC block 600 are from the PLB inputs (ICPE_X, ICPE_Y, and ICPE_Z) or the cascaded inputs (ICPE_X_CASC, ICPE_Y_CASC, and ICPE_Z_CASC).

Similar to the inputs, cascaded outputs ZCPE_X_CASC, ZCPE_Y_CASC, and ZCPE_Z_CASC connect a CPE 200 to one or more locations above it in the CPE column 140. With this cascade arrangement, multiple CPE 200 instances can be chained together using cascaded connections that are direct (i.e., do not route into the programmable logic array 100) and therefore may have higher performance. This cascading of multiple CPE blocks 600 enables a flexible number of stages and clock cycles for performing CORDIC algorithms as is explained more fully below.

A clock signal ICPE_CLK, a clock enable signal ICPE_CE, and a reset signal ICPE_CLR may be provided to the CPE block 600 and cascaded to additional CPE blocks. For most of the discussion herein clocks, clock enables, and resets are not discussed in detail as their use would be readily apparent to a person of ordinary skill in the art.

Bus widths for the various inputs and outputs may vary based on the applications. As non-limiting examples, some bit widths that may be used for different applications are video and audio 9-12 bits, wireless communication 16 bits, and some acoustic applications 24 or 25 bits. Of course, these are examples only and embodiments of the invention may be practiced with a wide variety of bit widths for a wide variety of applications.

The CORDIC algorithm is an iterative solution useful for a wide range of functions, such as sine, cosine, tangent, arctangent, vector magnitude, etc. Hardware implementations of the CORDIC algorithm may be made relatively efficient because the algorithm only uses shifts and adds to implement, rather than complex multiplication operations.

The CORDIC algorithm is based on rotation of an initial vector (with an endpoint xin, yin) to a new angle in a plane for a rotated vector (with an endpoint xR, yR) and is derived from the general rotation expressions:

$$x_R = M_{in} \cos(\beta+\theta) = x_{in} \cos\theta - y_{in} \sin\theta \quad \text{Equation 1}$$

$$y_R = M_{in} \sin(\beta+\theta) = x_{in} \sin\theta + y_{in} \cos\theta \quad \text{Equation 2}$$

These expressions can be rearranged as:

$$x_R = \cos\beta(x - y\tan\theta) \quad \text{Equation 3}$$

$$y_R = \cos\beta(y + x\tan\theta) \quad \text{Equation 4}$$

where $M_{in}$ is the modulus of the vector, $\beta$ is the initial angle, and $\theta$ is the rotation angle.

The CORDIC algorithm performs the rotation as a series of micro-rotations by elementary angles such that the rotation angle $\theta$ can be defined as a summation of a series of elementary rotation angles. Each of the rotation angles includes a decision on which direction to rotate. Thus, the $\cos\theta$ term becomes a constant because $\cos\theta = \cos(-\theta)$. The iterative rotation can then be described as:

$$x_{i+1} = K_i(x_i - y_i d_i 2^{-i}) \quad \text{Equation 5}$$

$$y_{i+1} = K_i(x_i - y_i d_i 2^{-i}) \quad \text{Equation 6}$$

It can be shown that the summation of the $K_i$ terms yields a constant that can be removed from the iteration equations and applied after the iterations are completed. That constant term can be expressed as:

$$K_i = \cos(\tan^{-1} 2^i) = 1/(1+2^{-2i})^{1/2} \quad \text{Equation 7}$$

The constant term approaches the value 0.6073 as the number of iteration approaches infinity.

As the rotation angle is decomposed into the micro-rotations, the sequence of micro-rotations can be represented by a decision vector representing the sequence of the directions of each of the elementary rotations. Thus, the angle of the rotation can be expressed as:

$$z_{i+1} = z_i - d_i \tan^{-1}(2^{-i}) \quad \text{Equation 8}$$

In general, the CORDIC algorithm may operate in a rotation mode to determine new coordinates after a vector is rotated through a predetermined angle, or a vectoring mode to determine a rotation angle when a vector is rotated to align with the x-axis.

In rotation mode, an angle accumulation is initialized with the total desired rotation angle. At each iteration, the rotation decision is made to reduce the magnitude of the residual angle in the angle accumulation. As a result, the decision at each iteration is based on the sign of the residual angle after the previous step. After the iterations, the x accumulation will be the new x location, the y accumulation will be the new y location, and the angle accumulation will be near zero.

Thus, for rotation mode, the CORDIC equations are:

$$x_{i+1} = x_i - y_i d_i 2^{-i} \quad \text{Equation 9}$$

$$y_{i+1} = y_i + x_i d_i 2^{-i} \quad \text{Equation 10}$$

$$z_{i+1} = z_i - d_i \tan^{-1}(2^{-i}) \quad \text{Equation 11}$$

where, if $z_i < 0$ then $d_i = -1$ else $d_i = +1$

In vectoring mode, the CORDIC algorithm rotates the input vector by whatever angle is necessary to align the rotated vector with the x-axis (i.e., make the y term approach zero). Thus, the angle accumulation is initialized to zero and the rotation decision is made to reduce the magnitude of the y accumulator. As a result, the decision at each iteration is based on the sign of the y accumulation from the previous step. After the iterations, the y accumulation will be near zero, the x accumulation will be the new x location (which also represents the magnitude of the vector since y is near zero), and the angle accumulation will be the total angle of rotation.

Thus, for vectoring mode, the CORDIC equations are:

$$x_{i+1} = x_i - y_i d_i 2^{-i} \quad \text{Equation 12}$$

$$y_{i+1} = y_i + x_i d_i 2^{-i} \quad \text{Equation 13}$$

$$z_{i+1} = z_i - d_i \tan^{-1}(2^{-i}) \quad \text{Equation 14}$$

where, if $y_i < 0$ then $d_i = +1$ else $d_i = -1$

As can be seen by equations 9-14, the vector equations are substantially the same with the only difference being that the decision element $d_i$ is dependent on the angle accumulation in the rotation mode and dependent on the y accumulation in the vectoring mode.

A minor modification of the CORDIC algorithm allows computation of linear functions, with the expressions:

$$x_{i+1} = x_i - 0 * y_i d_i 2^{-i} = x_i \quad \text{Equation 15}$$

$$y_{i+1} = y_i + x_i d_i 2^{-i} \quad \text{Equation 16}$$

$$z_{i+1} = z_i - d_i (2^{-i}) \quad \text{Equation 17}$$

where, if $z_i < 0$ then $d_i = -1$ else $d_i = +1$

Another minor modification of the CORDIC algorithm allows computation of hyperbolic functions, with the expressions:

$$x_{i+1} = x_i + y_i d_i 2^{-i} \quad \text{Equation 18}$$

$$y_{i+1} = y_i + x_i d_i 2^{-i} \quad \text{Equation 19}$$

$$z_{i+1} = z_i - d_i \tanh^{-1}(2^{-i}) \quad \text{Equation 20}$$

where, if $z_i < 0$ then $d_i = -1$ else $d_i = +1$

From examining the different equations for $x_{i+1}$ for rotation, vectoring, linear, and hyperbolic, one can conclude that a mode variable (m) may be applied to $x_i$ with the values of 1 for circular (rotation and vectoring) operations, 0 for linear operations, and −1 for hyperbolic operations. The equations for $y_{i+1}$ are the same for all of the different operations. Finally, the equations for $z_{i+1}$ have a difference of the term $d_i \tan^{-1}(2^{-i})$ for circular (rotation and vectoring) operations, $(2^{-i})$ for linear operations, and $-d_i \tanh^{-1}(2^{-i})$ for hyperbolic operations. This term is provided by a lookup table, so providing the different terms based on the modes of circular, linear, and hyperbolic is relatively easy to pre-compute and store in the lookup table.

Figure 3:
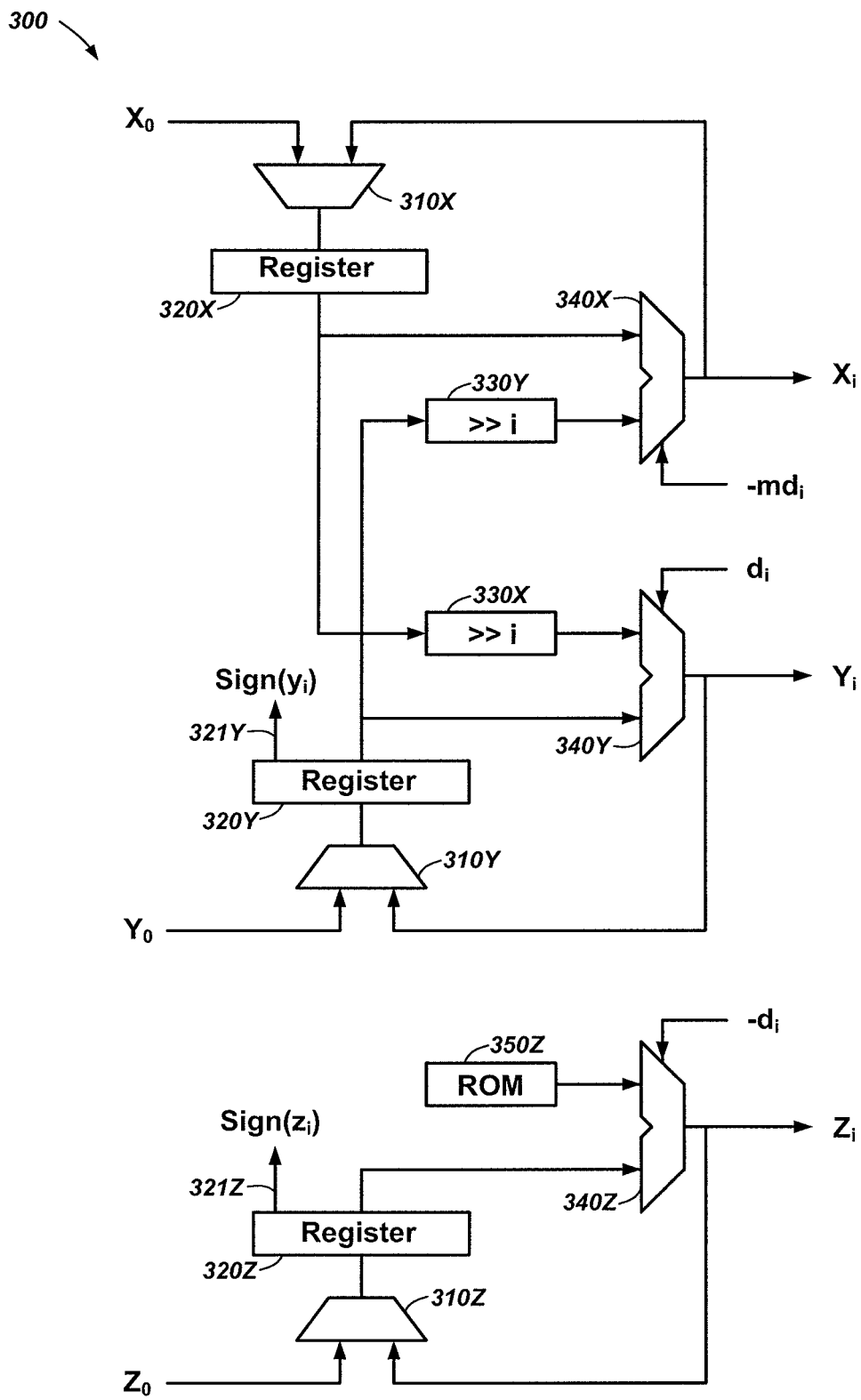
FIG. 3 is a simplified block diagram of a serial implementation for performing CORDIC operations.

FIG. 3 is a simplified block diagram of a serial implementation for performing CORDIC operations. In FIG. 3, one iteration is performed per clock cycle. In the X path, an input X vector ($X_0$) and an output X vector ($X_i$) feed an X multiplexer 310X. The X multiplexer 310X selects the input X vector ($X_0$) at the beginning of a CORDIC operation and selects the output X vector ($X_i$) as a feedback path for each subsequent iteration of the algorithm. The value from the X multiplexer 310X is clocked into an X register 320X. An adder/subtractor (Add/Sub) 340X adds or subtracts the value of the X register 320X and a value from variable Y shifter 330Y to generate the output X vector (Xi). The selection of addition or subtraction is made by the term (−mdi) feeding the Add/Sub 340X. Shift values and values for (m) and (di) will be explained after explanation of the Y paths and the Z paths.

In the Y path, an input Y vector ($Y_0$) and an output Y vector ($Y_i$) feed a Y multiplexer 310Y. The Y multiplexer 310Y selects the input Y vector ($Y_0$) at the beginning of a CORDIC operation and selects the output Y vector ($Y_i$) as a feedback path for each subsequent iteration of the algorithm. The value from the Y multiplexer 310Y is clocked into a Y register 320Y. An adder/subtractor (Add/Sub) 340Y adds or subtracts the value of the Y register 320Y and a value from variable X shifter 330X to generate the output Y vector (Yi). The selection of addition or subtraction is made by the term (di) feeding the Add/Sub 340Y.

In the Z path, an input Z ($Z_0$) vector and an output Z vector ($Z_i$) feed a Z multiplexer 310Z. The Z multiplexer 310Z selects the input Z vector ($Z_0$) at the beginning of a CORDIC operation and selects the output Z vector ($Z_i$) as a feedback path for each subsequent iteration of the algorithm. The value from the Z multiplexer 310Z is clocked into a Z register 320Z. An adder/subtractor (Add/Sub) 340Z adds or subtracts the value of the Z register 320Z and a value from a look-up table (e.g., ROM 350Z). The selection of addition or subtraction is made by the term (−di) feeding the Add/Sub 340Z.

The sign bit 321Y from the Y register 320Y and the sign bit 321Z from the Z register 320Z may be used in the different operational modes to determine the value for di.

From the equations above, values for m, di, and $e_i$ can be selected to perform each of the operations for rotation, vectoring, linear, and hyperbolic as follows:

Circular:
m=1
di=−1 if $z_i<0$, else $d_i=+1$
$e_i = \tan^{-1}(2^{-i})$
Vectoring:
m=1
di=+1 if $y_i<0$, else $d_i=−1$
$e_i = \tan^{-1}(2^{-i})$
Linear:
m=0
di=−1 if $z_i<0$, else $d_i=+1$
$e_i = (2^{-i})$
Hyperbolic:
m=−1
di=−1 if $z_i<0$, else $d_i=+1$; for rotation mode
di=+1 if $y_i<0$, else $d_i=−1$; for vectoring mode
$e_i = \tanh^{-1}(2^{-1})$ The shift values for the variable X shifter 330X and the variable Y shifter 330Y perform the multiplication of the $2^{-i}$ term in the CORDIC equations as a shift based on the iteration number (i). Thus, on the first iteration, variable X shifter 330X and variable Y shifter 330Y perform an arithmetic shift right of one place, on the second iteration an arithmetic shift right of two places is performed and on the Nth iteration, an arithmetic shift right of N places is performed.

Figure 4:
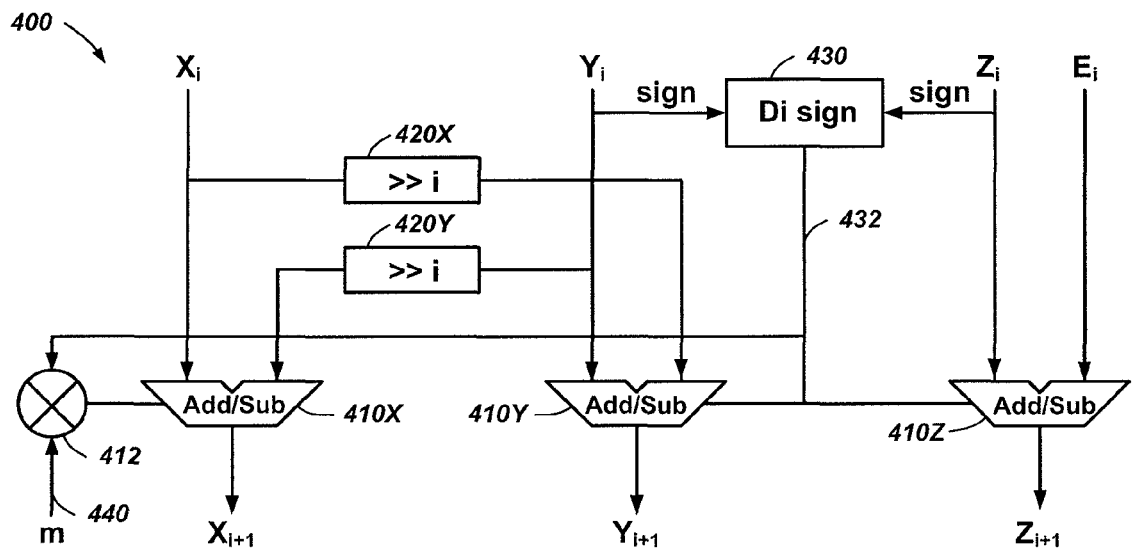
FIG. 4 is a simplified block diagram of a pipeline block for performing a single CORDIC iteration according to one or more embodiments of the present invention.

FIG. 4 is a simplified block diagram of a pipeline block for performing a single CORDIC iteration according to one or more embodiments of the present invention. The registered serial implementation of FIG. 3 performs one iteration per clock cycle. As a result, if 20 iterations are to be performed to achieve the desired accuracy, the FIG. 3 implementation will take 20 clock cycles to complete.

Figure 5:
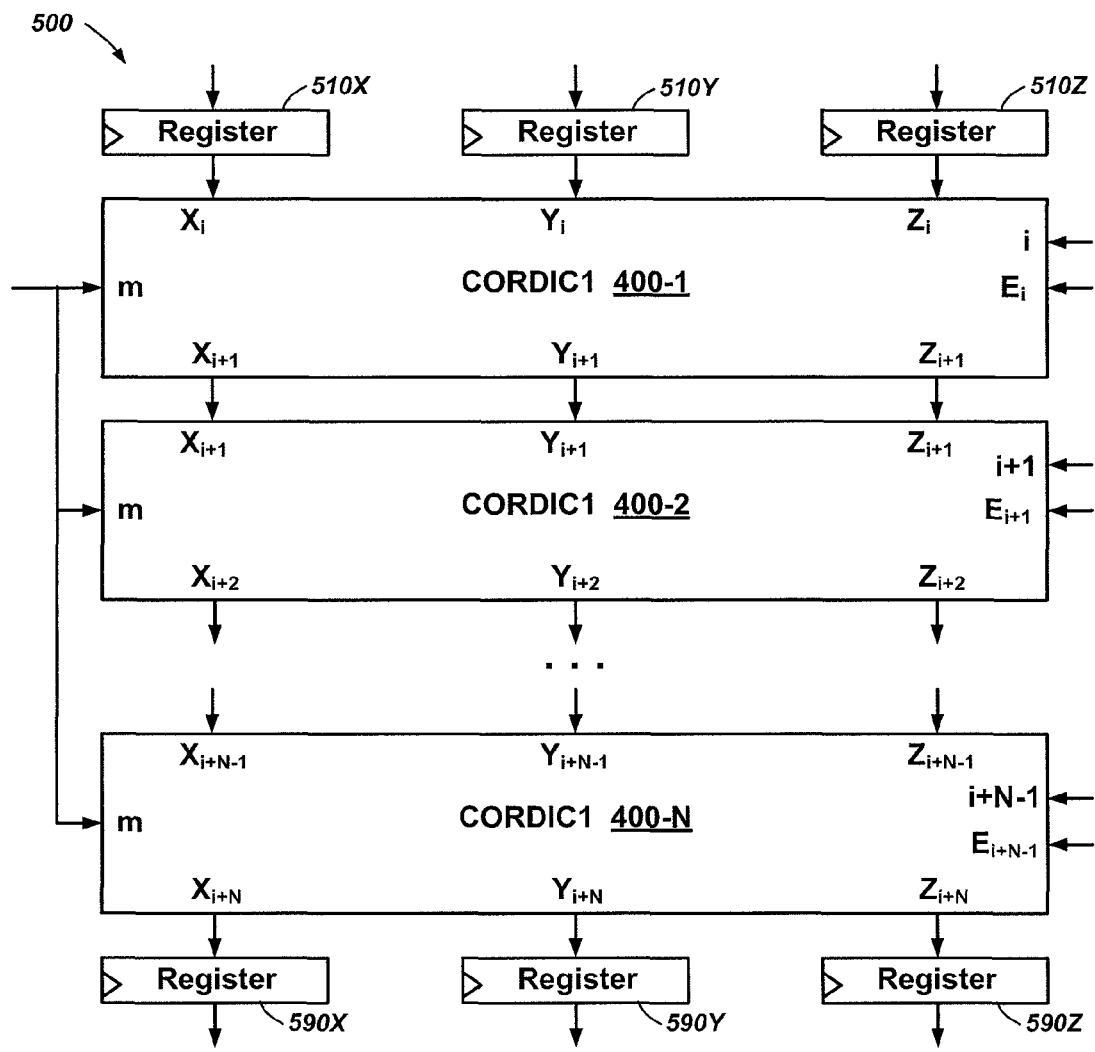
FIG. 5 is a simplified block diagram illustrating multiple CORDIC iteration stages pipelined together.

The FIG. 4 embodiment is one stage CORDIC1 400 of a pipeline of multiples stages as illustrated in the cascading of multiple stages in FIG. 5. The single stage CORDIC1 400 of FIG. 4, includes a 3-vector input $(x_i, y_i, z_i)$, a 3-vector output $(x_{i+1}, y_{i+1}, z_{i+1})$, an elementary angle term $E_i$ and an input (m).

The elementary angle term $E_i$ is a vector with values defined for the different modes the same as defined with respect to $e_i$ of FIG. 3. Variable X shifter 420X shifts the X input X, by the iteration amount (i) as explained above with reference to FIG. 3. Similarly, variable Y shifter 420Y shifts the Y input $Y_i$ by the iteration amount (i).

A Di sign evaluator 430 (also referred to herein as an add/subtract determiner) generates the di signal 432 based on which type of operation is to be performed as discussed above with reference to FIG. 3. Add/Sub (adder/subtractor) 410X adds or subtracts the $X_i$ input and a variably shifted value of the $Y_i$ input. Add/Sub 410Y adds or subtracts the $Y_i$ input and a variably shifted value of the $X_i$ input. Add/Sub 410Z adds or subtracts the $Z_i$ input and an $E_i$ input. The addition or subtraction selection for each of Add/Sub 410X, Add/Sub 410Y, and Add/Sub 410Z are based on $-m*d_i$, $d_i$, and $-d_i$, respectively as explained above with reference to FIG. 3.

Multiplier 412 (may also be referred to herein as an arithmetic function modifier) is very simple since it is only a one-bit multiplication. The mode input 440(m) is multiplied by the di signal 432 to determine whether add/sub 410X should add or subtract based on a combination of the mode input 440 and the di signal 432.

FIG. 5 is a simplified block diagram illustrating multiple CORDIC iteration stages pipelined together to form a CORDICN block 500. One or more instances of CORDIC1 (400-1, 400-2, 400-N) are cascaded to form a computation structure that implements N iterations of a CORDIC algorithm in a single clock cycle. The number of cascaded instances "N" is set by a desired peak clock frequency since the higher the value of N, the longer the timing paths from input to output. The desired clock frequency is a function of the application targeted for the programmable logic array. As a non-limiting example, if each iteration in a CORDIC1 400 has a longest timing path of about 100 picoseconds, then 10 CORDIC 1 400 blocks could potentially be cascaded in the CORDICN block to meet a clock cycle of about 1 nanosecond. In this example, 10 iterations of the CORDIC algorithm would be performed in one clock cycle in the CORDICN block.

An "i" input to each CORDIC1 400 block indicates the current iteration being performed by that block and is used to define the amount of shift required in the variable shift registers. An Ei input to each CORDIC1 400 block is used in the Z path. Finally, the "m" input to each CORDIC1 400 block is defined based on what type of operation is being performed.

Input registers 510X, 510Y, and 510Z for inputs $X_i$, $Y_i$, and $Z_i$, respectively are used to store the values for each vector entering the first CORDIC1 block 400-1. Similarly, output registers 590X, 590Y, and 590Z for output $X_{i+N}$, $Y_{i+N}$, and $Z_{i+N}$, respectively are used to store the values for each vector exiting the last CORDIC1 block 400-N. Depending on timing constraints, some embodiments may include both input registers 510 and output registers 590, only input registers 510, or only output registers 590.

Figure 6:
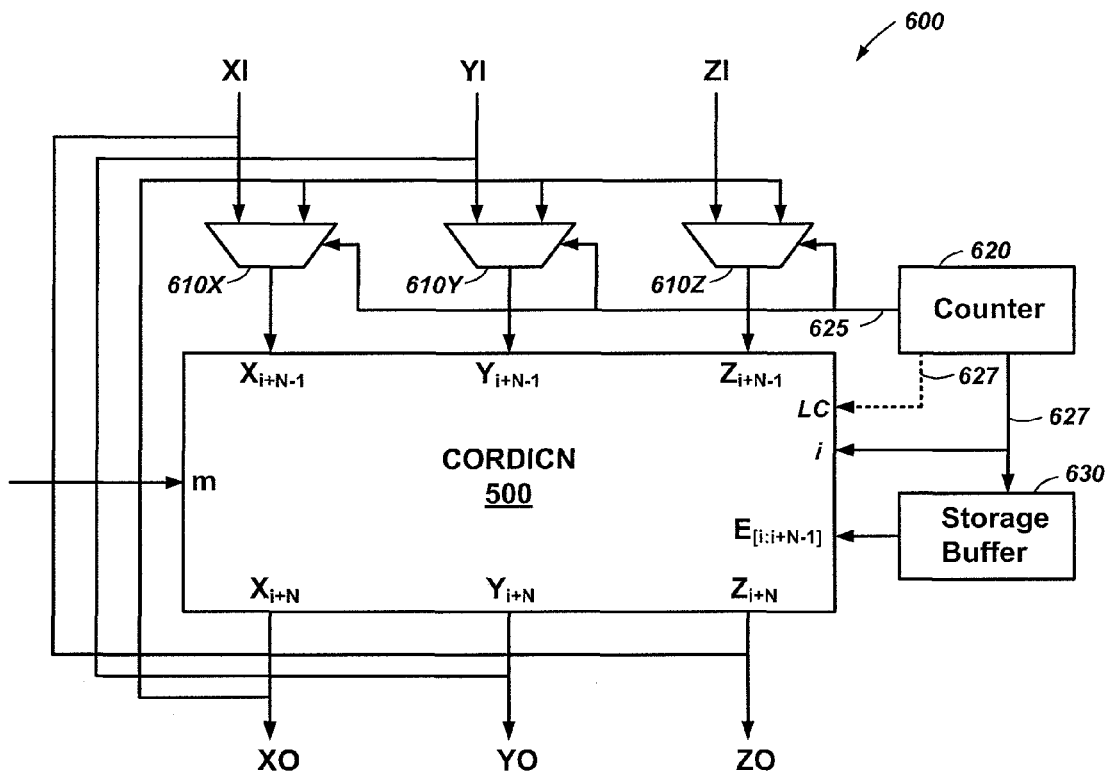
FIG. 6 is a simplified block diagram of a combination of serial and pipelined stages for performing CORDIC iterations according to one or more embodiments of the present invention.

FIG. 6 is a simplified block diagram of a combination of serial and pipelined stages to form a CORDIC engine 600 for performing CORDIC iterations according to one or more embodiments of the present invention. A set of multiplexers 610X, 610Y and 610Z select which input should be used for the inputs to the CORDICN block 500. At the beginning of a CORDIC operation, a cycle start indicator 625 from a counter 620 selects the inputs XI, YI, and ZI to preload the start values for the X, Y, and Z vectors, respectively. At all other times, the outputs XO, YO, and ZO are selected as feedback terms to the CORDICN block 500.

A storage buffer 630 provides the proper $E_i$ values based on the current iterations being performed in the CORDICN block 500 and the type of CORDIC operation that is being performed. The storage buffer may be part of the CORDIC engine 600, elsewhere on the integrated circuit, mapped into programmable logic on the integrated circuit, or external to the integrated circuit.

The counter 620 provides the cycle start indicator 625 and keeps track of a number of macro-iterations (M) that have been performed. With the counter, the CORDIC engine can perform N, 2N, 3N, . . . M*N iterations. Referring to FIGS. 4, 5, and 6, each CORDIC1 block 400 performs a micro-iteration as a single iteration of a CORDIC algorithm. The CORDICN block 500 includes N CORDIC1 blocks 400 to perform a macro-iteration comprising N micro-iterations per clock cycle. The CORDIC engine 600 performs M macro-iterations to complete the CORDIC algorithm. As a non-limiting example, assume 20 iterations are needed for the desired accuracy and bit widths of the vector inputs and the desired CORDIC algorithm. If there are N micro-iterations per clock cycle, then the counter would track 5 macro-iteration to generate the 20 iterations as M*N (i.e., 5*4).

The counter also provides the iteration numbers that are currently being performed to the storage buffer 630 so it can provide the proper $E_i$ values and to the CORDICN block 500 so each of the CORDIC1 blocks 400 know the amount of shift required in the variable shifters.

The counter may be configured a number of ways. As a simple non-limiting example, the counter may be an up counter that loads a new initialization vector when the counter is at zero then counts up to the number of macro-iterations desired. At the maximum count, the counter may rollover and begin again with a new set of data or it may stop and wait for an external signal (not shown) to indicate that the next input data is ready to be processed.

The flexibility for selecting the number of micro-iterations and the number of macro-iterations allow adaptability to different data rates as well as the tailoring of the number of CORDIC1 blocks based on real estate and clock cycle constraints. Clock cycles have been discussed above relative to how many micro-iterations may be performed per clock cycle.

For data rate considerations, precision can be traded of with data rates. As the input data rate goes lower, the CORDIC engine 600 can be configured to do a higher number of macro-iterations thereby maintaining its efficiency and achieving more precision. Conversely, as the input data rate goes higher, the number of macro-iterations can be reduced to keep data throughput balanced with data input rates. As a non-limiting example, assume that there are 5 CORDIC1 blocks 400 per CORDICN block 500 and each CORDIC1 block 400 can perform a micro-iteration in 10 nanoseconds (nS). Therefore, each macro-iteration takes 50 nS or more. If 30 total iterations are desired, they may be performed in 6 clock cycles for a total iteration time of 300 nS or more. Thus, the configuration of N=5, M=6, and 10 nS per micro-iteration can support a data rate of about 33 MHz or less.

However, assume that for some applications that the CORDIC engine is configured to have input data rates of 50 MHz. The CORDIC engine described above can be reconfigured to perform 4 macro-iterations. In that configuration, N=5, M=4, and 10 nS per micro-iteration so the CORDIC engine can complete 20 total iterations in about 200 nS to support the data rate of 50 MHz or less.

By cascading multiple CORDIC engines 600 together, as shown in FIG. 2, tradeoffs can be made between data throughput and data latency. As a non-limiting example, if the CORDIC engine 600 is capable of doing 4 iterations of the CORDIC algorithm at 400 MHz, the input data rate is 200 MHz and 16 iterations are required, two CPE instances can be chained to perform the necessary computation with a latency of 2 data clock cycles. If 24 iterations are required, then a chain of 3 CPE instances can be constructed.

Of course, a person of ordinary skill in the art will understand the timing numbers discussed above were simplified to show examples and may not include many considerations such as signal loading and setup and hold timing requirements.

In the embodiment of FIG. 6, the counter 620 provides the iteration numbers for each of the CORDIC1 blocks 400. Thus, if there are 4 CORDIC1 blocks 400 instantiated, on the first macro-iteration, the counter 620 provides the iteration numbers 1, 2, 3, and 4. On the next macro-iteration, the counter 620 provides the iteration numbers 5, 6, 7, and 8. On the last macro-iteration, the counter provides the iteration numbers N*(M−1)+1, N*(M−1)+2, N*(M−1)+3, and N*(M−1)+4.

Shifters capable of shifting over a wide range may be difficult to design both in terms of real estate on the integrated circuit and timing considerations. In some embodiments, the fixed number of micro-iterations for any given design may be used to simplify the shifter design in the CORDIC1 blocks 400.

Figure 7:
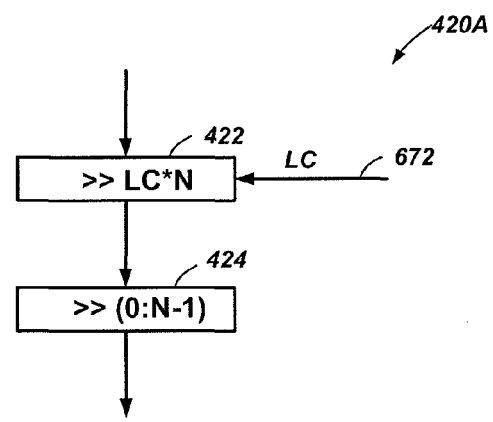
FIG. 7 is a simplified block diagram of an alternate shifter embodiment.

FIG. 7 is a simplified block diagram of an embodiment of an alternate shifter 420A. In this embodiment, a first shifter 422 shifts in multiples of N and a second shifter 424 shifts by a fixed amount based on where the CORDIC1 block 400 is in the chain. Assume a non-limiting example of 4 CORDIC1 blocks 400 such that N=4 and the counter counts for 0 to 3 and provides only the loop count signal 627 (FIGS. 6 and 7) to the shifters. The first shifter 422 would then shift in increments of 4 depending on the loop count signal 627. In other words, on the first macro-iteration the first shifter 422 shifts 0, on the second macro-iteration the first shifter 422 shifts 4, on the third macro-iteration the first shifter 422 shifts 8, and on the fourth macro-iteration the first shifter 422 shifts 12.

The second shifter 424 may actually be hardwired and does not need to be a flexible shifter. Rather, the second shifter 424 shifts by a fixed amount based on the location of the CORDIC1 block 400 in the chain. Thus, the first CORDIC1 block 400 shifts 1, the second CORDIC1 block 400 shifts 2, the third CORDIC1 block 400 shifts 3, and the fourth CORDIC1 block 400 shifts 4. Hardwiring the second shifter 424 may require that each of the CORDIC1 blocks 400 would be configured differently depending on where it is in the chain. However, the second shifter 424 may be configured to perform a shift of any value between 1 and N. The value for shifting may then be programmed by a simple binary (or other coding) input (not shown) to select the shift value for each CORDIC 1 block 400.

While the present invention has been described herein with respect to certain preferred embodiments, those of ordinary skill in the art will recognize and appreciate that it is not so limited. Rather, many additions, deletions, and modifications to the preferred embodiments may be made without departing from the scope of the invention as hereinafter claimed. In addition, features from one embodiment may be combined with features of another embodiment while still being encompassed within the scope of the invention as contemplated by the inventors.

What is claimed is:

1. A CORDIC engine, comprising:
an N-stage CORDIC processor configured for performing N micro-iterations and generating a 3-vector CORDIC output responsive to a 3-vector CORDIC input, the N-stage CORDIC processor comprising N CORDIC processors operably cascaded in series, each of the CORDIC processors comprising:
a first variable shifter operably coupled to a first vector input and configured to generate a shifted first vector by an amount responsive to an iteration indicator from the counter;
a second variable shifter operably coupled to a second vector input and configured to generate a shifted second vector by an amount responsive to the iteration indicator from the counter;
a first adder/subtractor for arithmetically combining the first vector input and the shifted second vector to generate a first vector output;
a second adder/subtractor for arithmetically combining the second vector input and the shifted first vector to generate a second vector output; and
a third adder/subtractor for arithmetically combining a third vector input and a elementary angle input correlated to the iteration indicator to generate a third vector output;
a counter configured for counting a number of M macro-iterations and indicating a start of the cycle iterations; and
a multiplexer configured for selecting an input to the N-stage CORDIC processor as the 3-vector CORDIC input at the start of the cycle iterations or the 3-vector CORDIC output at other times;
wherein the 3-vector CORDIC output is configured to be complete after N*M clock cycles by generating the N micro-iterations for each of the M macro-iterations.

2. The CORDIC engine of claim 1, wherein each of the M macro-iterations are configured to be a clock period long and the N micro-iterations are configured to be performed in less than or equal to the clock period.

3. The CORDIC engine of claim 1, further comprising a storage buffer for providing elementary angle inputs to the N-stage CORDIC processor for each of the N micro-iterations.

4. The CORDIC engine of claim 1, further comprising a programmable logic routing block configured for interfacing the 3-vector CORDIC input and the 3-vector CORDIC output to an additional CORDIC engine, a programmable logic array, or a combination thereof.

5. The CORDIC engine of claim 1, further comprising a 3-vector register operably coupled between the 3-vector CORDIC input and a first CORDIC processor in the series of N CORDIC processors.

6. The CORDIC engine of claim 1, further comprising a 3-vector register operably coupled between a last CORDIC processor in the series of N CORDIC processors and the 3-vector CORDIC output.

7. The CORDIC engine of claim 1, wherein the first variable shifter and the second variable shifter each comprise:
a first shifter configured for shifting by a multiple of N; and
a second shifter configured for shifting by a value between one and N or a value between 0 and N−1.

8. The CORDIC engine of claim 1, further comprising an add/subtract determiner configured to select a mode of add or subtract for at least one of the first adder/subtractor, the second adder/subtractor, and the third adder/subtractor responsive to at least one of a sign bit of the second vector input and a sign bit of the third vector input.

9. The CORDIC engine of claim 8, further comprising an arithmetic function modifier configured for modifying the mode of add or subtract for the first adder/subtractor responsive to a mode input.

10. A programmable logic array, comprising:
a plurality of programmable logic blocks configured to be programmable for a variety of interconnections and a variety of functions; and
a CORDIC engine operably coupled to at least some of the plurality of programmable logic blocks, the CORDIC engine comprising:
an N-stage CORDIC processor configured for performing N micro-iterations and generating a 3-vector CORDIC output responsive to a 3-vector CORDIC input, the N-stage CORDIC processor comprising N CORDIC processors operably cascaded in series, each of the CORDIC processors comprising:
a first variable shifter operably coupled to a first vector input and configured to generate a shifted first vector by an amount responsive to an iteration indicator from the counter;
a second variable shifter operably coupled to a second vector input and configured to generate a shifted second vector by an amount responsive to the iteration indicator from the counter;
a first adder/subtractor for arithmetically combining the first vector input and the shifted second vector to generate a first vector output;
a second adder/subtractor for arithmetically combining the second vector input and the shifted first vector to generate a second vector output; and
a third adder/subtractor for arithmetically combining a third vector input and a elementary angle input correlated to the iteration indicator to generate a third vector output;
a counter configured for counting a number of M macro-iterations and indicating a start of the cycle iterations; and
a multiplexer configured for selecting an input to the N-stage CORDIC processor as the 3-vector CORDIC input at the start of the cycle iterations or the 3-vector CORDIC output at other times;
wherein the 3-vector CORDIC output is configured to be complete after N*M clock cycles by generating the N micro-iterations for each of the M macro-iterations.

11. The programmable logic array of claim 10, wherein each of the M macro-iterations are configured to be a clock period long and the N micro-iterations are configured to be performed in less than or equal to the clock period.

12. The programmable logic array of claim 10, further comprising a storage buffer for providing elementary angle inputs to the N-stage CORDIC processor for each of the N micro-iterations.

13. The programmable logic array of claim 10, further comprising a routing block configured for interfacing the 3-vector CORDIC input and the 3-vector CORDIC output to an additional CORDIC engine, a programmable logic array, or a combination thereof.

14. The programmable logic array of claim 10, further comprising a 3-vector register operably coupled between the 3-vector CORDIC input and a first CORDIC processor in the series of N CORDIC processors.

15. The programmable logic array of claim 10, further comprising a 3-vector register operably coupled between a last CORDIC processor in the series of N CORDIC processors and the 3-vector CORDIC output.

16. The programmable logic array of claim 10, wherein the first variable shifter and the second variable shifter each comprise:
a first shifter configured for shifting by a multiple of N; and
a second shifter configured for shifting by a value between one and N or a value between 0 and N−1.

17. A method, comprising:
performing N micro-iterations of a CORDIC algorithm and generating a 3-vector CORDIC output responsive to a 3-vector CORDIC input by:
variably shifting a first vector input to generate a shifted first vector by an amount responsive to an iteration indicator from the counting the number of M macro-iterations;
variably shifting a second vector input to generate a shifted second vector by an amount responsive to the iteration indicator;
adding or subtracting the first vector input and the shifted second vector to generate a first vector output;
adding or subtracting the second vector input and the shifted first vector to generate a second vector output; and
adding or subtracting a third vector input and a elementary angle input correlated to the iteration indicator to generate a third vector output;
counting a number of M macro-iterations for the CORDIC algorithm and indicating a start of the cycle iterations;
repeating the performing the N micro-iterations for each of the M macro-iterations; and
selecting an input to the N-stage CORDIC processor as the 3-vector CORDIC input at the start of the cycle iterations or the 3-vector CORDIC output at other times.

18. The method of claim 17, wherein each of the M macro-iterations are a clock period long and the N micro-iterations are performed in less than or equal to the clock period.

19. The method of claim 17, further comprising providing elementary angle inputs for each of the N micro-iterations.

20. The method of claim 17, further comprising interfacing the 3-vector CORDIC input and the 3-vector CORDIC output to an additional CORDIC engine, a programmable logic array, or a combination thereof.

21. The method of claim 17, further comprising storing the 3-vector CORDIC input in a 3-vector register.

22. The method of claim 17, further comprising storing the 3-vector CORDIC output in a 3-vector register.

23. The method of claim 17, wherein the variably shifting the first vector input and variably shifting the second vector input each comprise:
shifting by a multiple of N; and
shifting by a value between one and N or a value between 0 and N−1.

24. The method of claim 17, further comprising selecting a mode of add or subtract for at least one of the adding or subtracting the first vector input, the adding or subtracting the second vector input, and the adding or subtracting the third vector input responsive to at least one of a sign bit of the second vector input and a sign bit of the third vector input.

25. The method of claim 24, further comprising modifying the mode of add or subtract for the adding or subtracting the first vector input responsive to a mode input.

* * * * *